US008670659B2

(12) United States Patent
Haruguchi et al.

(10) Patent No.: US 8,670,659 B2
(45) Date of Patent: Mar. 11, 2014

(54) CAMERA MODULE

(71) Applicant: Panasonic Corporation, Osaka (JP)

(72) Inventors: Takashi Haruguchi, Fukuoka (JP);
Hiroshi Gotoh, Kumamoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/867,685

(22) Filed: Apr. 22, 2013

(65) Prior Publication Data
US 2013/0287383 A1 Oct. 31, 2013

(30) Foreign Application Priority Data

Apr. 26, 2012 (JP) ................... 2012-101494

(51) Int. Cl.
*G03B 13/34* (2006.01)
(52) U.S. Cl.
USPC .......................................... 396/133
(58) Field of Classification Search
USPC .......................................... 396/133
See application file for complete search history.

(56) References Cited

U.S. PATENT DOCUMENTS

| 7,295,388 | B2* | 11/2007 | Shyu et al. ..................... 359/814 |
| 8,320,756 | B2* | 11/2012 | Jacobsen et al. ............. 396/133 |
| 8,442,393 | B2* | 5/2013 | Bang et al. ....................... 396/55 |
| 2006/0002699 | A1* | 1/2006 | Chen et al. ..................... 396/144 |
| 2007/0188620 | A1* | 8/2007 | Takahashi ................. 348/208.99 |
| 2011/0097062 | A1* | 4/2011 | Tsuruta et al. .................. 396/55 |
| 2012/0154614 | A1 | 6/2012 | Moriya et al. |
| 2012/0229901 | A1 | 9/2012 | Moriya et al. |

FOREIGN PATENT DOCUMENTS

JP 2011-065140 A 3/2011

\* cited by examiner

*Primary Examiner* — Rodney Fuller
(74) *Attorney, Agent, or Firm* — McDermott Will & Emery LLP

(57) ABSTRACT

In a camera module, a lens for forming an image on an imaging element having a rectangular light receiving surface is formed in a shape obtained by removing a peripheral portion of a circular lens, such as a generally oval shape, and a cylindrical lens barrel coaxially holding the lens is formed in a shape conforming to that of the lens. A part of a focal adjustment actuator is disposed in a space created on a side of the lens barrel in correspondence with the removed portion of the lens, whereby reduction in size of the entirety of the camera module is promoted.

5 Claims, 9 Drawing Sheets

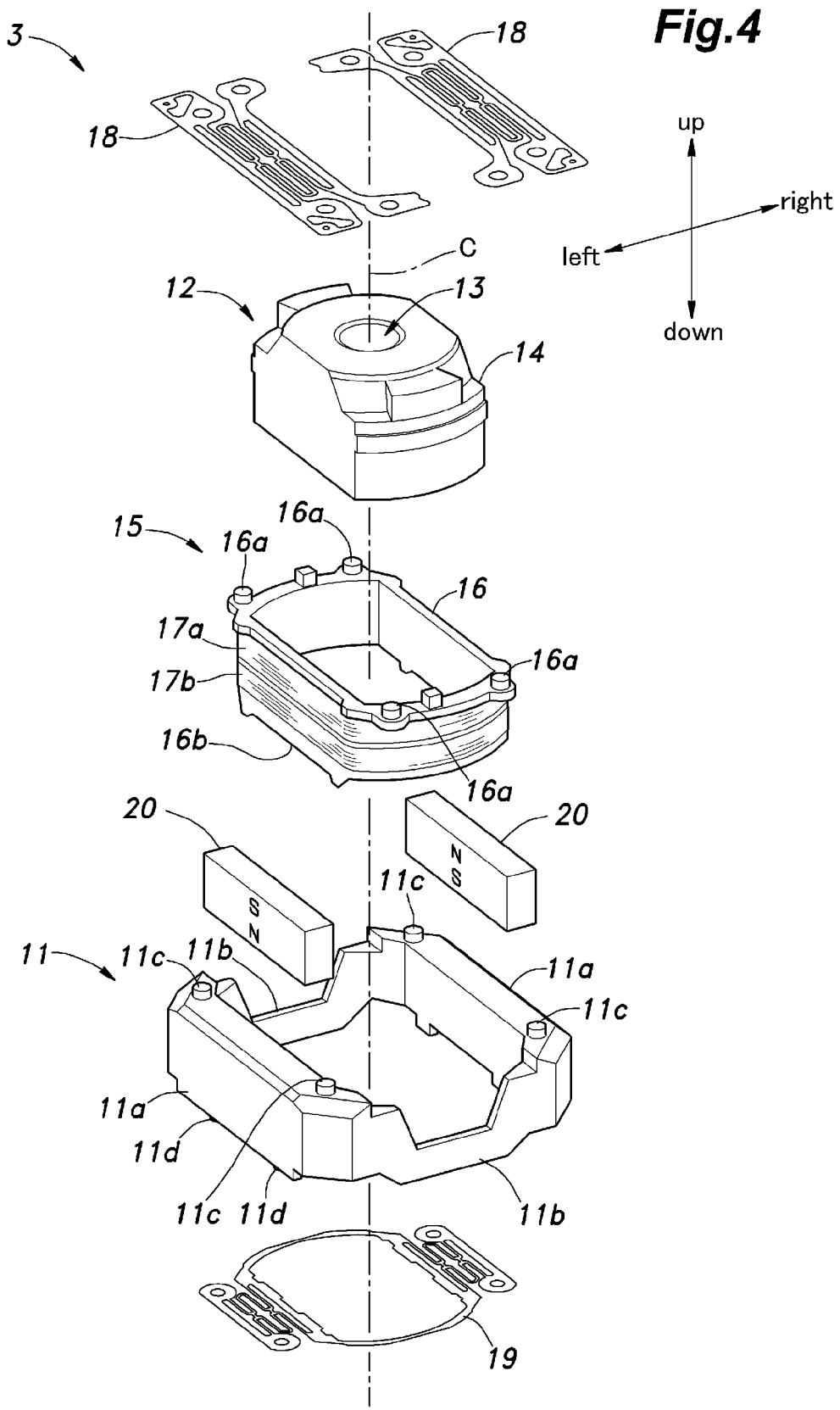

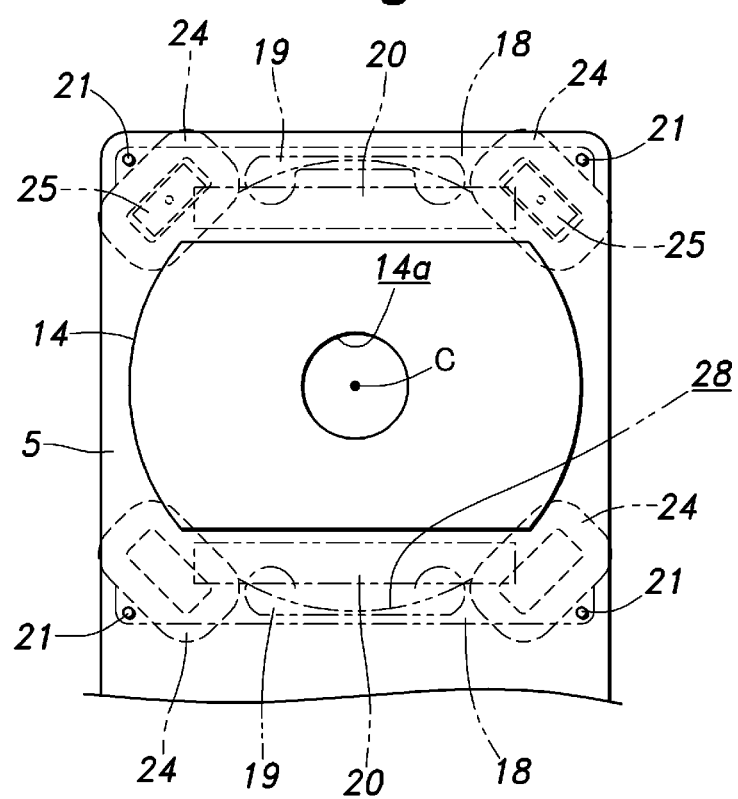

CAMERA MODULE

BACKGROUND OF THE INVENTION

1. Field of the Invention

The present invention relates to a camera module including an imaging element having a rectangular light receiving surface and a lens for forming an image on the imaging element.

2. Description of the Related Art

Portable cameras and cameras built into mobile devices or the like typically include an imaging element (such as a CCD) and a lens for forming an image on the imaging element, and many of them are provided with an auto-focus mechanism for automatically adjusting the focus at the time of image capture and/or an anti-shake (or image stabilization) mechanism for reducing blur caused by camera shake due to hand-held shooting. To realize such mechanisms, there is proposed a camera module in which a lens (or lens holder) is supported by a spring member having a cantilever structure such that the lens is movable in a direction of the optical axis thereof and in a plane perpendicular to the optical axis, and the movement in each direction is controlled by magnetic driving (see JP 2011-65140A, for example).

The aforementioned camera module includes a lens barrel holding the lens coaxially, a lens holder receiving the lens barrel therein and holding the same, and a magnet holder coaxially surrounding the lens holder, wherein the lens holder is provided with a focusing coil and the magnet holder is provided with a permanent magnet to form an auto-focusing lens drive apparatus. The auto-focusing lens drive apparatus is supported by four suspension wires each having one end affixed to a base board having an imaging device mounted thereon, in such a manner that the entirety of the auto-focusing lens drive apparatus is rockable in two directions perpendicular to the optical axis. Further, the permanent magnet includes permanent magnet sections for camera-shake compensation, and camera-shake compensation coils are provided on coil boards disposed so as to face the permanent magnet sections, respectively, whereby a camera-shake correction apparatus is configured. In a portable device having a thus-configured camera module mounted thereon, it is possible to perform auto-focusing and camera-shake correction by controlling corresponding magnetic drive circuits.

However, in the camera module disclosed in JP 2011-65140A, the lens is circular in shape, and the lens barrel surrounding and holding the circular lens has a substantially cylindrical shape and is integrally fitted into the lens holder which has a substantially rectangular box-like shape. The focusing coil includes sections extending along four sides of the lens holder, and the permanent magnet sections are disposed on corresponding four sides of the magnet holder which surrounds the lens holder and has a substantially rectangular shape. Further, the camera-shake correction coils facing the relevant permanent magnet sections are disposed on the outside of the four sides of the magnet holder. Thus, four plate-shaped permanent magnet sections are respectively disposed on the four sides of a square having a center positioned on the optical axis of the lens (lens barrel) and the camera-shake correction coils are disposed on the outside of the permanent magnet sections, and this increases the size of the camera module particularly in the radial direction of the lens. Such a camera module will require a large space when installed into a portable device, thus making it difficult to reduce the size of the portable device.

SUMMARY OF THE INVENTION

In view of the aforementioned problems in the related art, a primary object of the present invention is to provide a camera module with a reduced size.

According to one aspect of the present invention, there is provided a camera module, including: an imaging element having a rectangular light receiving surface; a lens for forming an image on the imaging element; a cylindrical lens barrel that coaxially holds the lens; a spring member that elastically supports the lens barrel such that the lens barrel is movable relative to the imaging element at least in a direction along an optical axis of the lens; and a focus adjustment actuator that moves the lens barrel along the optical axis against a spring force of the spring member, wherein: the lens is formed in a shape obtained by removing a peripheral portion of a circular lens, such that the lens has a reduced size in one direction perpendicular to the optical axis; the lens barrel is formed in a shape conforming to that of the lens as viewed along the optical axis; and a part of the focal adjustment actuator is disposed in a space created on a side of an outer circumferential surface of the lens barrel in correspondence with the removed portion of the lens.

In the foregoing camera module, since the lens is formed in a shape obtained by removing a peripheral portion of a circular lens and the cylindrical lens barrel coaxially holding the lens is formed in a shape conforming to that of the lens, a space is created on a side of the lens barrel in correspondence with the removed portion of the lens. A part of the focal adjustment actuator is disposed in this space so that the focus adjustment actuator is positioned closer to the optical axis of the lens, whereby reduction in size of the entirety of the camera module is promoted.

Preferably, the lens is cut along lines corresponding to a pair of longer sides of the rectangular light receiving surface.

According to this structure, the lens having a generally oval shape can be obtained from a circular lens by cutting off (or removing) side portions thereof along the lines corresponding to the pair of longer sides of the rectangular light receiving surface of the imaging element. This allows a larger portion of the circular lens to be removed, and thus, promotes reduction in size of the lens (and hence, the camera module) even further.

In a preferred embodiment, the focus adjustment actuator includes a focusing coil wound around the outer circumferential surface of the lens barrel and a permanent magnet disposed on a side of the outer circumferential surface of the lens barrel so as to face the focusing coil, and at least part of the permanent magnet is disposed in the space.

According to this structure, the focus adjustment actuator is realized as a magnetic driving type including the focusing coil and the permanent magnet. In this structure, the focusing coil wound around the outer circumferential surface of the lens barrel includes a section disposed in the space creased on the side of the outer circumferential surface of the lens barrel in correspondence with the removed portion of the lens, and therefore, the permanent magnet disposed to face the section of the focusing coil can be positioned closer to the optical axis of the lens, and therefore, the size of the camera module can be reduced.

In another preferred embodiment, at least part of the spring member is disposed in the space as viewed along the optical axis.

According to this structure, the spring member for elastically supporting the lens barrel can be positioned closer to the optical axis of the lens, and therefore, the size of the camera module can be reduced.

In yet another preferred embodiment, the camera module further includes a flat cable electrically connected to the focus adjustment actuator, the flat cable extending in the one direction perpendicular to the optical axis.

According to this structure, a part of the flat cable overlaps the space created on a side of an outer circumferential surface of the lens barrel in correspondence with the removed portion of the lens, and this portion of the flat cable may be used to form a wiring pattern thereon, whereby contributing to reduction in size of the camera module.

BRIEF DESCRIPTION OF THE DRAWINGS

Now the present invention is described in the following with reference to the appended drawings, in which:

FIG. 4 is an exploded perspective view of the lens actuator unit;

FIG. 7b is a cross-sectional view taken along line VIIb-VIIb in FIG. 7a;

FIG. 7c is a cross-sectional view taken along line VIIc-VIIc in FIG. 7a;

FIG. 9 is a plan view showing an arrangement of component parts of an actuator relative to removed portions of the lens.

DETAILED DESCRIPTION OF THE PREFERRED EMBODIMENTS

Now, an embodiment of the present invention will be described in detail with reference to the appended drawings.

Figure 1:
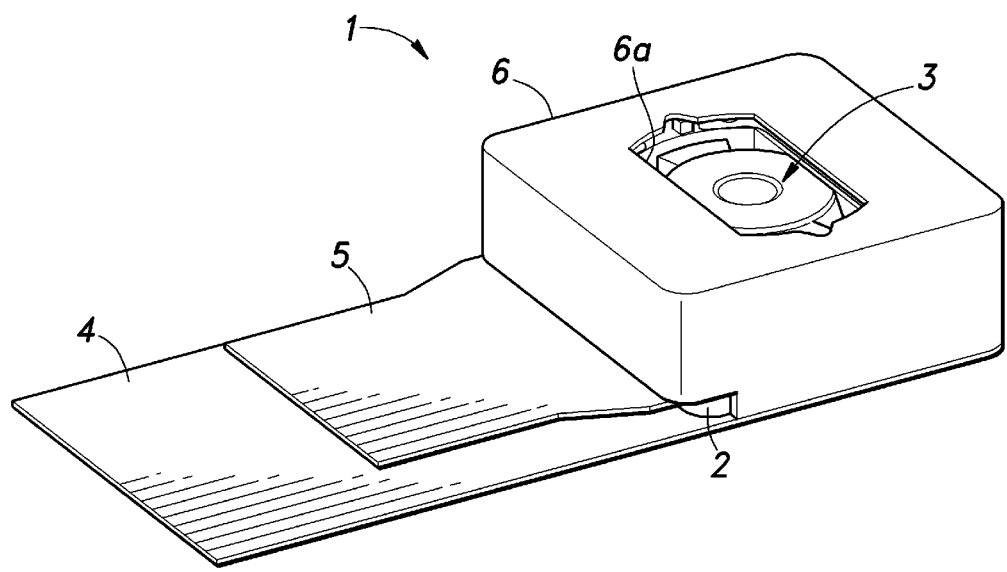
FIG. 1 is a perspective view showing an overall outer shape of a camera module according to an embodiment of the present invention.

FIG. 1 is a perspective view showing an overall outer shape of a camera module 1 according to an embodiment of the present invention. The illustrated camera module 1 comprises: an image sensor unit 2 having a rectangular thin plate-like shape; a lens actuator unit 3 having a substantially parallelepiped shape and disposed on the image sensor unit 2; an image sensor flat cable 4 having one end portion connected to the bottom surface (a surface facing away from the lens actuator unit 3) of the image sensor unit 2; and an actuator flat cable 5 having one end portion connected to the bottom surface (a surface facing the image sensor unit 2) of the lens actuator unit 3. The lens actuator unit 3 is covered by a rectangular box-shaped cover 6. A portion of the top plate of the cover 6 located away from the image sensor unit 2 is provided with an opening 6a that allows external light to pass therethrough and impinge on the lens actuator unit 3.

Figure 2:
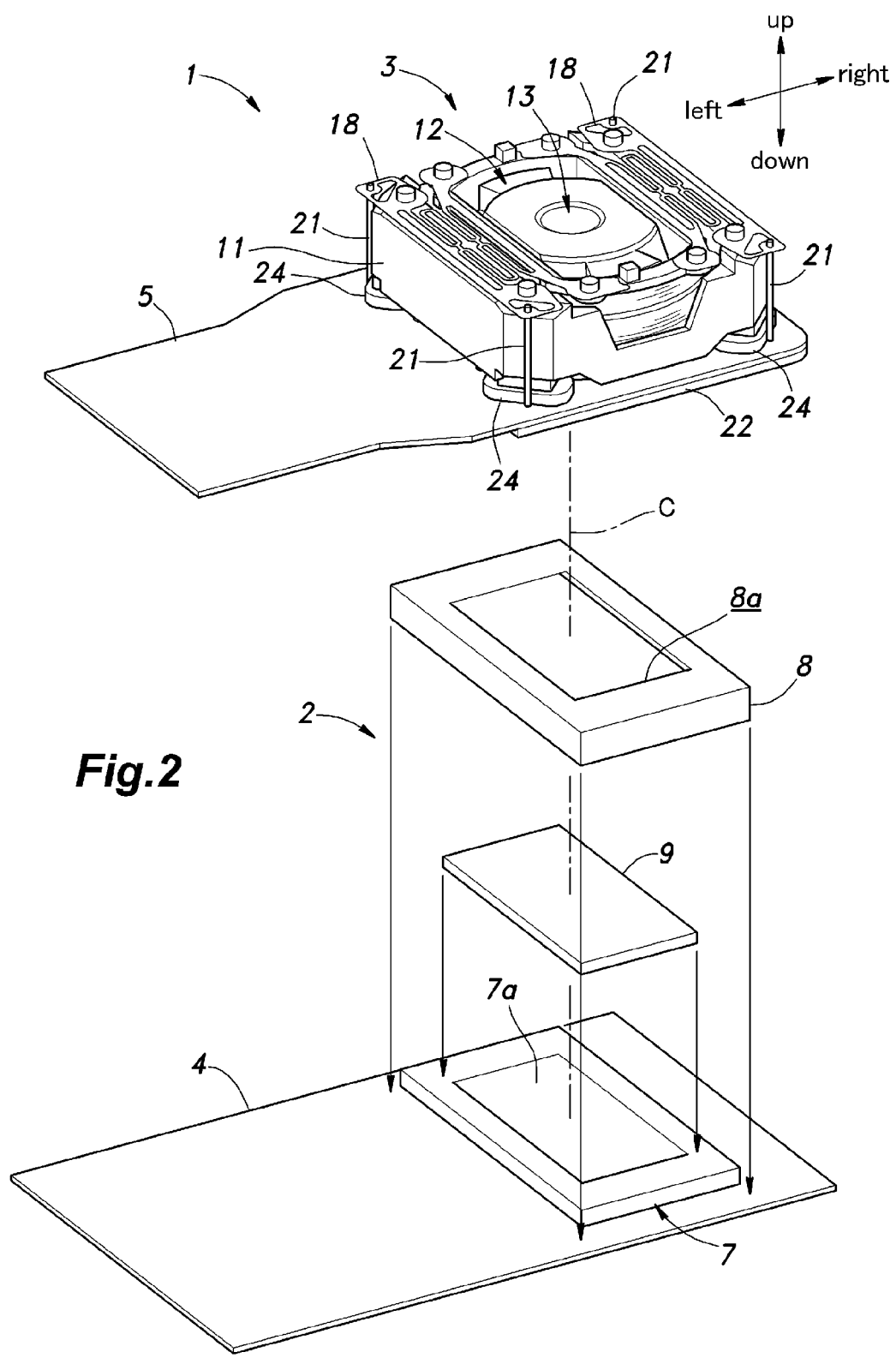
FIG. 2 is an exploded perspective view showing a lens actuator unit and an image sensor unit, with a cover being removed from the lens actuator unit.

FIG. 2 is an exploded perspective view showing the lens actuator unit 3 and the image sensor unit 2, in which the cover 6 has been removed. As shown in this drawing, the image sensor unit 2 includes: an image sensor 7 (such as a CCD or a CMOS) mounted on an upper surface of one end portion of the image sensor flat cable 4 and serving as an imaging element; a rectangular lid-like base 8 mounted on the image sensor flat cable 4 so as to cover an outer peripheral part of the image sensor 7; and a filter 9 made of glass and mounted to the base 8 to cover a light receiving surface 7a of the image sensor 7. The light receiving surface 7a has a rectangular shape corresponding to usual photographic images, and the base 8 is provided with an opening 8a having a size corresponding to that of the light receiving surface 7a.

Figure 3:
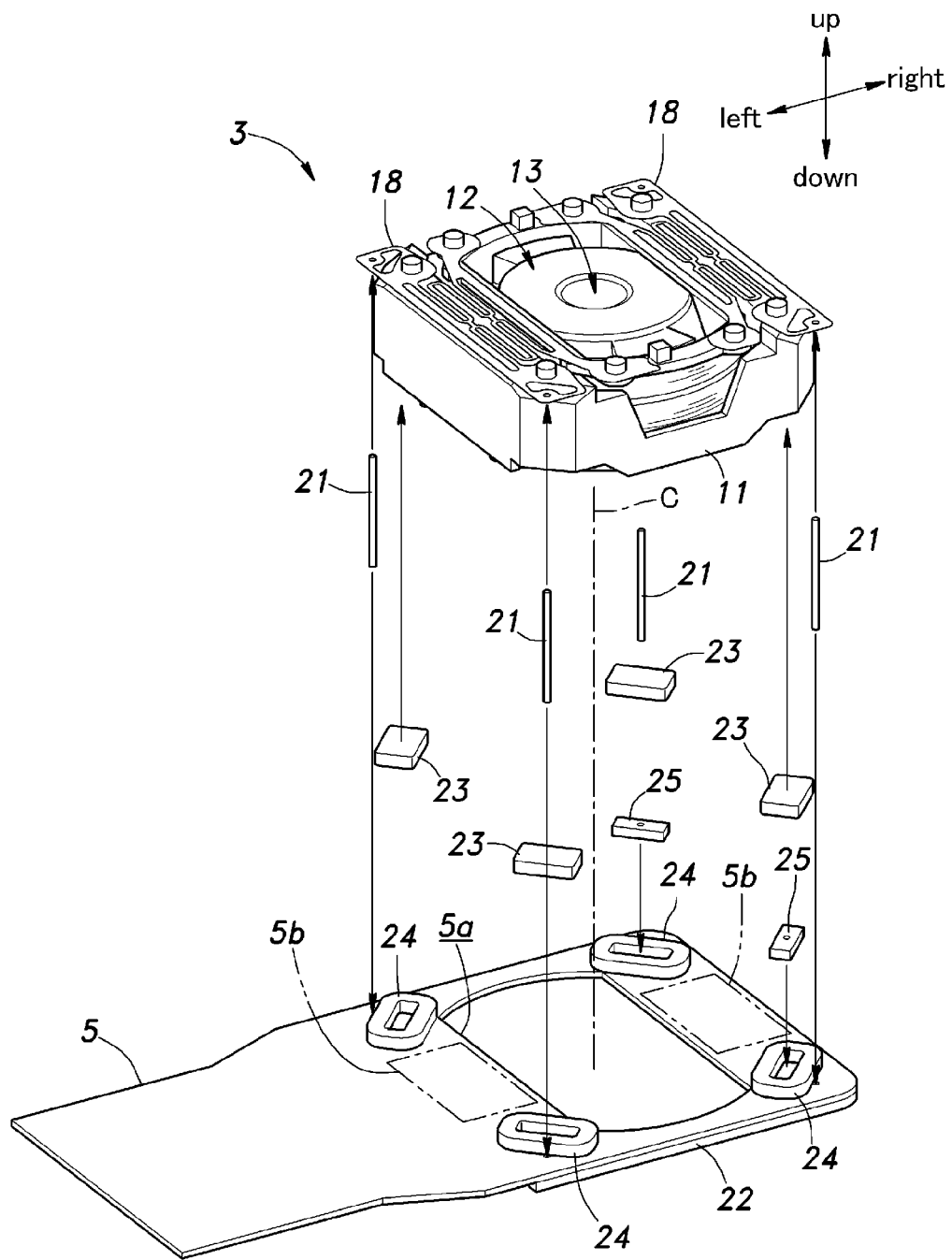
FIG. 3 is an exploded perspective view showing a shift actuation mechanism for the lens actuator unit.

As shown in FIGS. 3 and 4, the lens actuator unit 3 includes a movable base 11 having a generally rectangular frame-like shape and a lens unit 12 received in the movable base 11. The lens unit 12 is constituted by a lens group 13, which will be described later, and a lens barrel 14 surrounding the lens group 13 about its optical axis C and holding the lens group 13. The lens barrel 14 is formed in a generally oval shape having a pair of parallel sides as viewed in the plan view along the optical axis C. An annular focusing coil unit 15 is fitted over the outer circumferential surface (namely, a surface extending around the optical axis C) of the lens barrel 14. The movable base 11 and the lens barrel 14 are each made of a synthetic resin material.

The focusing coil unit 15 includes: a coil bobbin 16 which, similarly to the lens barrel 14, is formed in a generally oval annular shape as viewed in the plan view along the optical axis C; a pair of focusing coils 17a and 17b separately wound around the outer circumferential surface of the coil bobbin 16 at different positions in the vertical direction (namely, in the direction of the optical axis C). The focusing coils 17a and 17b are wound in the opposite directions from each other. The coil bobbin 16 is made of a synthetic resin material and secured to the outer circumferential surface of the lens barrel 14 by means of an adhesive, for example. It is to be noted that before the lens barrel 14 and the coil bobbin 16 are attached together by means of an adhesive, the component parts are assembled such that the lens position and angle are adjusted properly.

The movable base 11 is formed to have a pair of mutually opposing thick wall portions 11a and a pair of mutually opposing thin wall portions 11b such that the wall portions 11a and 11b define a generally rectangular shape having four sides. The pair of thick wall portions 11a are arranged to face each other in the longitudinal direction of the actuator flat cable 5 (in the left and right direction of the drawing) in the assembled state of the camera module 1. The upper surfaces of the thick wall portions 11a (on the upper sides in the drawing) are integrally provided with boss portions 11c such that the boss portions 11c are spaced apart from each other by a predetermined distance, where each boss portion 11c has a cylindrical pin shape projecting in the upward direction in the drawing. Each boss portion 11c is located in the vicinity of one of the four corners of the rectangular movable base 11, and therefore, the boss portions 11c are provided at four positions in total. Similarly, the under surfaces of the thick wall portions 11a (on the under sides in the drawing) are integrally provided with boss portions 11d such that the boss portions 11d are spaced apart from each other by a predetermined distance, where each boss portion 11d has a cylindrical pin shape projecting in the downward direction in the drawing. A pair of boss portions 11d are provided to each of the thick wall portions 11a, and therefore, the boss portions 11d are provided at four positions in total.

In the illustrated camera module 1, the lens unit 12 to which the focusing coil unit 15 is integrally attached is adapted to be movable relative to the movable base 11 in the direction of the optical axis C. To achieve such a structure, upper and lower parts of the coil bobbin 16 of the focusing coil unit 15 are elastically supported by a pair of upper spring members 18 and a lower spring member 19. The annular upper surface of the coil bobbin 16 is integrally provided with boss portions 16a, each being located in the vicinity of one of the four corners of the upper surface of the coil bobbin 16 and having a cylindrical pin shape projecting in the upward direction in the drawing.

Figure 5A:
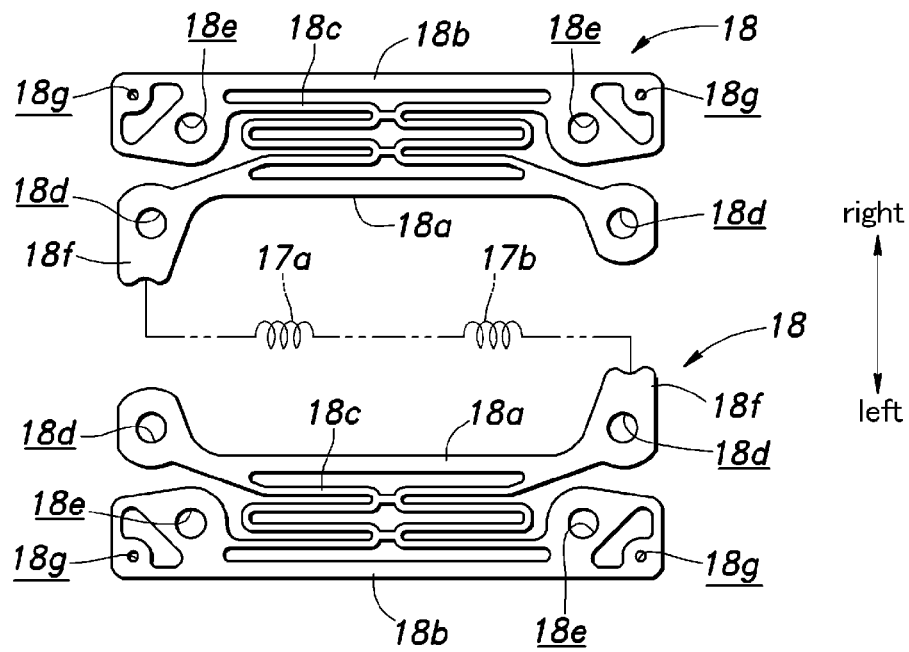
FIG. 5a is a plan view showing the shape of upper spring members.

The pair of upper spring members 18 are symmetric to each other with respect to the optical axis C, and each spring member 18 is formed by stamping a thin sheet of spring material. The upper spring members 18 are arranged in the longitudinal direction of the actuator flat cable 5 in the assembled state. As shown in FIG. 5a, each upper spring member 18 integrally includes an inner wing section 18a disposed on a side close to the optical axis C and having a shape like spread wings, an outer wing section 18b disposed outside the inner wing portion 18a and extending along the inner wing section 18a, and a connecting section 18c interposed between the wing sections 18a and 18b and having zigzag shaped portions.

A pair of connection holes 18d are respectively formed in the longitudinal end portions of the inner wing section 18a, and a pair of connection holes 18e are respectively formed in the longitudinal end portions of the outer wing section 18b. By inserting the boss portions 16a of the coil bobbin 16 into the corresponding connection holes 18d provided to the inner wing section 18a and securing them to each other using an adhesive or the like, the coil bobbin 16 (and hence, the lens unit 12) is joined to one end of each upper spring member 18. Further, by inserting the boss portions 11c of the movable base 11 into the corresponding connection holes 18e provided to the outer wing section 18b and securing them to each other using an adhesive or the like, an upper part of the movable base 11 is joined to the other end of each upper spring member 18.

Figure 5B:
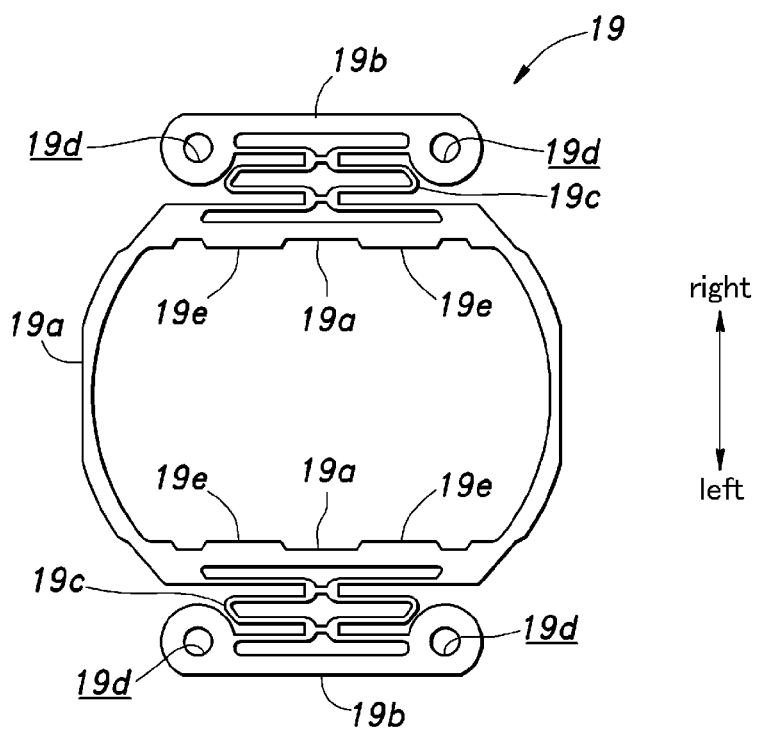
FIG. 5b is a plan view showing the shape of a lower spring member.

The lower spring member 19 is symmetric with respect to the optical axis C, and, similarly to the upper spring members 18, is formed by stamping a thin sheet of spring material, for example. As shown in FIG. 5b, the lower spring member 19 integrally includes an annular section 19a formed in a generally oval shape having two parallel sides in correspondence with the shape of the coil bobbin 16, a pair of wing sections 19b each extending along the corresponding one of the two parallel sides of the annular section 19a, and a pair of connecting sections 19c each interposed between the annular section 19a and the corresponding one of the wing sections 19b and having zigzag shaped portions.

The annular section 19a is shaped so as to substantially overlap the coil bobbin 16 as viewed in the plan view along the optical axis C, and is fixedly attached to the under surface of the coil bobbin 16 by means of an adhesive. A pair of connection holes 19d are respectively formed in the lengthwise end portions of each of the pair of wing sections 19b. The annular section 19a includes rectangular protrusions 19e inwardly protruding from an inner periphery of the annular section 19a. By securing the rectangular protrusions 19e to an under surface 16b of the coil bobbin 16 by means of an adhesive or the like, the under surface 16b of the coil bobbin 16 is joined to the inner peripheral part of the lower spring member 19. Further, by inserting the boss portions 11d provided on the underside of the movable base 11 into the corresponding connection holes 19d provided in the wing sections 19b of the lower spring member 19 and securing them to each other using an adhesive or the like, the lower part of the movable member 11 is joined to each wing section 19b of the lower spring member 19. In the thus obtained structure, the focusing coil unit 15 is elastically supported by the upper spring members 18 and the lower spring member 19 so as to be movable relative to the movable base 11 in the direction along the optical axis C.

Further, a pair of flat plate-shaped permanent magnets 20 are secured to the inner surfaces of the pair of thick wall portions 11a of the movable base 11, respectively, by means of an adhesive or the like such that the pair of permanent magnets 20 face each other. Each of the permanent magnets 20 is magnetized so as to have an N-pole in an upper part thereof corresponding to the upper focusing coil 17a and an S-pole in a lower part thereof corresponding to the lower focusing coil 17b. Thus, the lens unit 12 can be moved in the direction of the optical axis C in accordance with electric current caused to flow through the focusing coils 17a and 17b which are wound in the opposite directions from each other as described in the foregoing. This enables focus adjustment to be performed when taking pictures with a camera equipped with the camera module 1. It is to be noted that the focus adjustment control may be performed in conventional manner, and thus, explanation thereof will be omitted.

Next, explanation will be given of a shift actuation mechanism for driving the lens actuator unit 3 around the optical axis C and in directions perpendicular to the optical axis C. This driving of the lens actuator unit 3 is performed to correct the camera shake at the time of image capture, and may be controlled in a conventional manner. Therefore, explanation on a control mode thereof will be omitted. As shown in FIGS. 2 and 3, four mutually parallel elastic wires 21 are mounted on the actuator flat cable 5 so as to stand upright at positions corresponding to four corners of the lens actuator unit 3, respectively. It is to be noted that on an under surface of the actuator flat cable 5, a base plate 22 is provided to fixedly support one end of each elastic wire 21.

Each of the pair of upper spring members 18 is made of an electrically conductive spring material, and one end of the inner wing section 18a of each upper spring member 18 is provided with a land 18f, to which one end of the focusing coil 17a or 17b is soldered. The outer wing section 18b of each upper spring member 18 includes near each connection hole 18e a portion that is formed so as to project out from the movable base 11 in a state where the upper spring member 18 is mounted to the movable base 11, and this projecting portion is provided with a connection hole 18g into which a free end portion (an end portion opposite to the end portion fixed to the actuator flat cable 5) of a corresponding one of the elastic wires 21 is inserted. In this way, the lens actuator unit 3 is supported elastically so as to be movable around the optical axis C and in directions perpendicular to the optical axis C. Further, each elastic wire 21 is made of an electrically conductive spring material, whereby the focusing coils 17a and 17b are electrically connected to the actuator flat cable 5 via the upper spring members 18 and the elastic wires 21.

Four permanent magnets 23 for shifting (or for camera-shake correction) are fixedly mounted to the four corners of the under surface (a surface facing the actuator flat cable 5) of the movable base 11, respectively. Further, four coils 24 for shifting are mounted to the actuator flat cable 5 corresponding to the four permanent magnets 23, respectively. The actuator flat cable 5 is provided with a generally oval opening 5a corresponding to the focusing coil unit 15 such that the opening 5a has a shape substantially identical with the outline of the focusing coil unit 15 as viewed along the optical axis C, and the coils 24 for shifting are disposed at positions corresponding to four corners of the opening 5a.

Each of the permanent magnets 23 for shifting is formed in a rectangular shape and each of the coils 24 for shifting also is wound in a rectangular shape accordingly. The permanent magnets 23 (the coils 24) are arranged in point symmetry about the optical axis C at an interval of 90 degrees, such that the longitudinal direction of each permanent magnet (coil 24)

extends in a direction tangential to a circle having a center on the optical axis C. Further, two of the coils 24 disposed on one longitudinal end portion of the actuator flat cable 5 are each provided with a Hall elements 25 received in a central space defined thereby.

Figure 6:
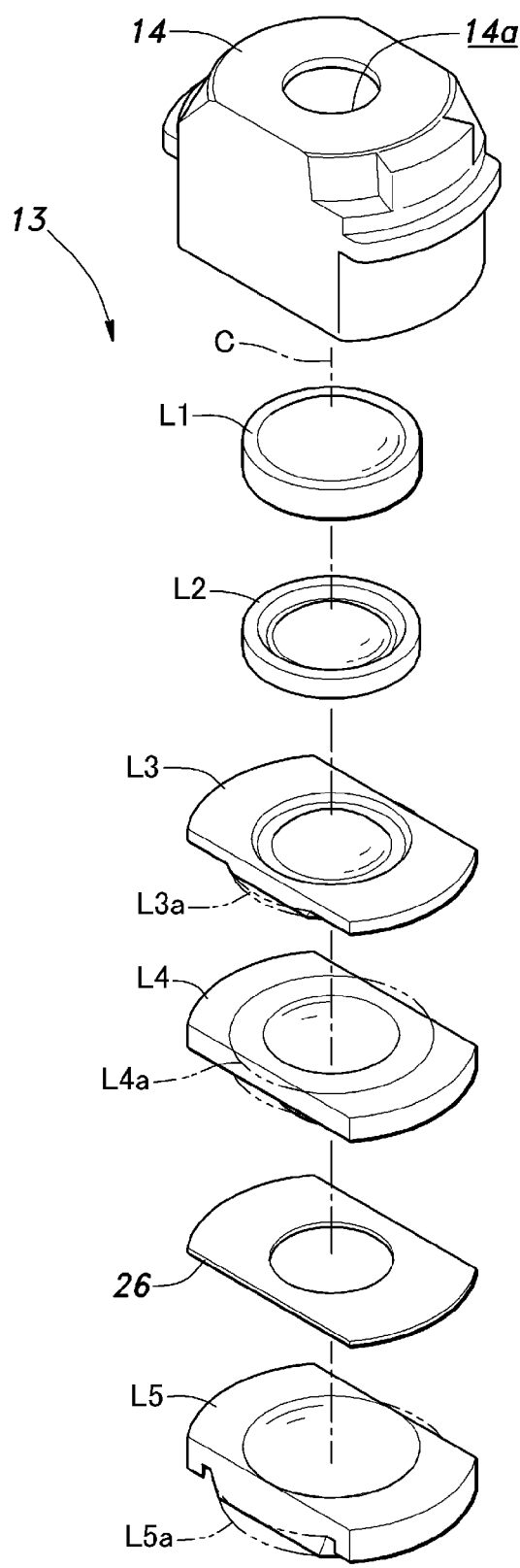
FIG. 6 is an exploded perspective view showing the structure of a lens group.

As shown in FIGS. 6 and 7, the lens group 13 includes first to fifth lenses L1 to L5 stacked along the optical axis C, with the first lens L1 being placed closest to an object to be imaged. A filter plate 26 for cutting stray light is disposed between the fourth lens L4 and the fifth lens L5. In the illustrated embodiment, the first and second lenses L1 and L2 on the side of an object to be imaged are embodied as circular lenses, while the third to fifth lenses L3 to L5 are each formed in a generally oval shape, which shape is obtained by removing (or cutting off) side portions of a circular lens that, if not removed, would direct the light passing therethrough to outside the pair of longer sides of the rectangular light receiving surface 7a of the image sensor 7, respectively. Namely, each of the lenses L3 to L5 includes a portion of the circular lens necessary for obtaining light covering the light receiving surface 7a of the image sensor 7 and does not include a portion of the circular lens not necessary for the same. It is to be noted here that it is possible that the lenses L3 to L5 may have a shape like a letter D, which is obtained by removing only a side portion of a circular lens that would direct the light passing therethrough to outside one of the pair of longer sides of the rectangular light receiving surface 7a.

Figure 8:
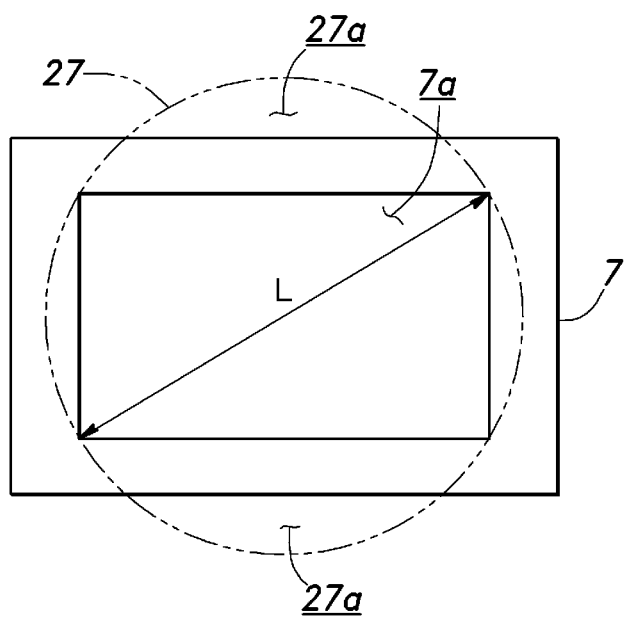
FIG. 8 is a plan view showing an image sensor.

With reference to FIG. 8, a circle 27 shown in a long- and double-short dashed line indicates an area in the plane including the light receiving surface 7a, which area would be irradiated by the light passing through the lens group 13 if the third to fifth lenses L3 to L5 were embodied as circular lenses and in which a degree of illumination and image quality necessary for image capturing would be maintained. This circle 27 may be referred to as an image circle. As will be appreciated from FIG. 8, to use the entire area of the light receiving surface 7a for image capturing, it is sufficient that the diameter of the image circle 27 coincides with the diagonal line L of the rectangular light receiving surface 7a. In such a state, the image circle 27 includes two areas 27a which are located outside the respective longer sides of the light receiving surface 7a and thus do not contribute to image capturing by the image sensor 7, where each area 27a is surrounded by the corresponding longer side of the light receiving surface 7a and a portion of the image circle 27. As described above, each of the third to fifth lenses L3 to L5 is formed by removing portions (L3a, L4a and L5a in FIG. 6) of a circular lens, which portions, if not removed, would create the areas 27a that would not contribute to image capturing. As a result, each of the third to fifth lenses L3 to L5 assumes a generally oval shape as viewed along the optical axis C. It is to be noted that each lens in the lens group 13 may have any shape so long as the light receiving surface 7a is covered by the image circle 27, and it does not necessarily have to have a shape obtained by removing side portions of a circular lens along straight lines as shown in the drawings, but may have a shape obtained by removing side portions of a circular lens along curved lines slightly convex outward.

Figure 7A:
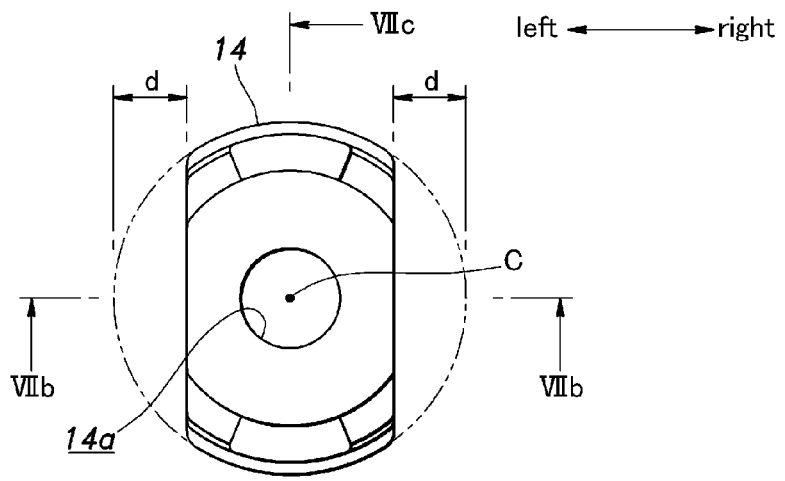
FIG. 7a is a plan view of a lens barrel.
Figure 7B:
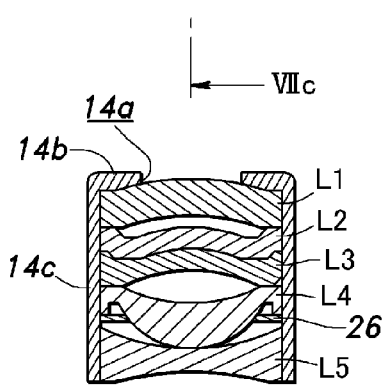
Figure 7C:
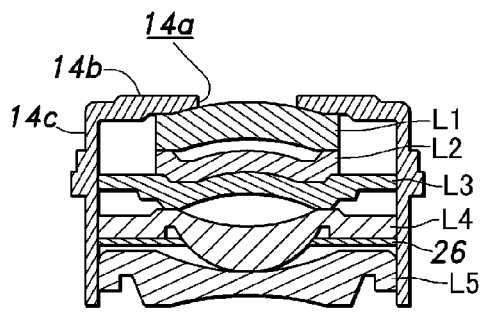

As shown in FIG. 7a, the lens barrel 14 has a generally oval outline as viewed along the optical axis C. With additional reference to FIGS. 7b and 7c, the lens barrel 14 is formed in an inverted bottomed cylindrical shape including a top plate 14b and a circumferential wall 14c, where the top plate 14 has a circular opening 14a formed at the central portion thereof such that the circular opening 14a has its center on the optical axis C, and the circumferential wall 14c serves to hold the lens group 13 (L1-L5, 26). As is described in the foregoing, the circumferential wall 14c is formed to conform to the generally oval shape of the third to fifth lenses L3 to L5. In FIG. 7a, a circle shown in a long- and double-short dashed line indicates the outline of the circumferential wall 14c if the circumferential wall 14c were formed to assume a circular shape as viewed along the optical axis C. As shown by a solid line in FIG. 7a, the circumferential wall 14c of the present embodiment has such a shape that is obtained by removing left and right side portions of the circle shown by the long- and double-short dashed line in FIG. 7a, the side portions each having a width d.

In this way, the outer size of the lens barrel 14 can be reduced in one direction perpendicular to the optical axis C (in the lateral direction in FIG. 7a), and therefore, the focusing coil unit 15 and the movable base 11 also can be formed to have a reduced dimension in the one direction. As shown by long- and double-short dashed line in FIG. 9, in the illustrated embodiment, part of the upper and lower spring members 18 and 19, the permanent magnets 20 and the focusing coils 17a and 17b (see FIG. 4), which form a focus adjustment actuator, can be disposed in the spaces corresponding to the removed side portions having width d, as viewed along the optical axis C.

In such a structure, the focusing coils 17a, 17b, the spring members 18, 19, and the permanent magnets 20, which form the focus adjustment actuator, are disposed closer to the optical axis C as compared to a case where each lens in the lens group 13 is embodied as a circular lens. Thus, the lens actuator unit 3 can be reduced in size and the entirety of the camera module 1 can be made compact, thereby favorably promoting reduction in size of a mobile device into which the camera module 1 is incorporated. Particularly, if the flat cables 4 and 5 are arranged to extend in the direction in which the size of the lens actuator unit 3 is reduced, the space necessary for installing the entirety of the camera module 1 including the space for routing the flat cables 4 and 5 can be reduced, and this enables even more compact design.

The coils 24 for shifting and the Hall elements 25 are electrically connected to the actuator flat cable 5. The opening 5a in the actuator flat cable 5 is provided for allowing the light passing through the lens group 13 to reach the image sensor 7, and has a shape in conformity with that of the lens group 13 (L1-L5, 26) as described in the foregoing. Thus, the opening 5a has a reduced dimension in the lengthwise direction of the actuator flat cable 5 as compared to a circular opening 28 that would be formed in the flat cable 5 if circular lenses were used as the lenses in the lens group 13. This allows a portion of the actuator flat cable 5 located between the pair of coils 24 for shifting on each side of the opening 5a to be left unremoved, and this portion may be used, for example, to form a wiring pattern 5b (see FIG. 3) thereon, which constitutes a circuit for the coils 24 for shifting and/or the Hall elements 25. This structure allows the wiring pattern 5b to be provided without increase in the length of the actuator flat cable 5, and therefore promotes a compact design.

Although the present invention has been described in terms of preferred embodiments thereof, it is obvious to a person skilled in the art that the present invention should not be limited to such embodiments and various alterations and modifications are possible without departing from the scope of the present invention which is set forth in the appended claims. For example, in the foregoing embodiment, each of the lenses L3 to L5 has a shape obtained by removing side portions of a circular lens that, if not removed, would direct the light passing therethrough to outside the pair of longer sides of the rectangular light receiving surface 7a of the image sensor 7, respectively. However, each lens may have a rectangular shape obtained by additionally removing portions of the circular lens that, if not removed, would direct the light passing therethrough to outside the pair of shorter sides of the rectangular light receiving surface 7a of the image sensor 7, respectively. This can reduce the size of the camera module 1 even further. It is also to be noted that not all of the component parts shown in the illustrated embodiment are necessarily indispensable, and they may be selectively used as appropriate.

As described above, the camera module according to the present invention includes a lens with portions unnecessary for image capturing being removed, and a part of the actuator is disposed in a space created by the removal of the portions, whereby the size of the camera module is reduced efficiently. Thus, this camera module can be used favorably as a camera module to be incorporated in a mobile device.

The contents of the original Japanese patent application(s) on which the Paris Convention priority claim is made for the present application as well as the contents of the references mentioned in this application are incorporated in this application by reference.

The invention claimed is:

1. A camera module, comprising:
an imaging element having a rectangular light receiving surface;
a lens for forming an image on the imaging element;
a cylindrical lens barrel that coaxially holds the lens;
a spring member that elastically supports the lens barrel such that the lens barrel is movable relative to the imaging element at least in a direction along an optical axis of the lens; and
a focus adjustment actuator that moves the lens barrel along the optical axis against a spring force of the spring member,
wherein:
the lens is formed in a shape obtained by removing a peripheral portion of a circular lens, such that the lens has a reduced size in one direction perpendicular to the optical axis;
the lens barrel is formed in a shape conforming to that of the lens as viewed along the optical axis; and
a part of the focal adjustment actuator is disposed in a space created on a side of an outer circumferential surface of the lens barrel in correspondence with the removed portion of the lens.

2. The camera module according to claim 1, wherein the lens is cut along lines corresponding to a pair of longer sides of the rectangular light receiving surface.

3. The camera module according to claim 1, wherein:
the focus adjustment actuator includes a focusing coil wound around the outer circumferential surface of the lens barrel and a permanent magnet disposed on a side of the outer circumferential surface of the lens barrel so as to face the focusing coil; and
at least part of the permanent magnet is disposed in the space.

4. The camera module according to claim 1, wherein at least part of the spring member is disposed in the space as viewed along the optical axis.

5. The camera module according to claim 1, further comprising a flat cable electrically connected to the focus adjustment actuator, the flat cable extending in the one direction perpendicular to the optical axis.

* * * * *